United States Patent
Kani

(10) Patent No.: US 8,413,562 B2
(45) Date of Patent: Apr. 9, 2013

(54) SLIDE CIRCULAR SAW

(75) Inventor: Toshiyuki Kani, Anjo (JP)

(73) Assignee: Makita Corporation, Anjo (JP)

( * ) Notice: Subject to any disclaimer, the term of this patent is extended or adjusted under 35 U.S.C. 154(b) by 730 days.

(21) Appl. No.: 12/461,721

(22) Filed: Aug. 21, 2009

(65) Prior Publication Data

US 2010/0058910 A1 Mar. 11, 2010

(30) Foreign Application Priority Data

Sep. 5, 2008 (JP) ................................. 2008-228891

(51) Int. Cl.
*B26D 1/16* (2006.01)
*B26D 3/02* (2006.01)

(52) U.S. Cl. ................................. 83/529; 83/473; 83/490

(58) Field of Classification Search .................... 83/529, 83/530, 581, 477, 477.2, 473, 490, 471.1–471.3; 30/505
See application file for complete search history.

(56) References Cited

U.S. PATENT DOCUMENTS

| 5,046,390 | A | * | 9/1991 | Sasaki | 83/471.2 |
| 5,355,635 | A | * | 10/1994 | Sasaki et al. | 451/461 |
| 5,495,784 | A | * | 3/1996 | Chen | 83/471.2 |
| 7,503,246 | B2 | * | 3/2009 | Imamura et al. | 83/529 |
| 7,549,360 | B2 | * | 6/2009 | Aoyama | 83/471.3 |
| 2009/0173200 | A1 | * | 7/2009 | Aoyama et al. | 83/471.3 |

FOREIGN PATENT DOCUMENTS

| JP | A-11-34002 | 2/1999 |
| JP | 2004-330655 A | 11/2004 |

OTHER PUBLICATIONS

Jan. 29, 2013 Office Action issued in Japanese Patent Application No. 2008-228891 (with translation).

* cited by examiner

*Primary Examiner* — Laura M. Lee
(74) *Attorney, Agent, or Firm* — Oliff & Berridge PLC

(57) ABSTRACT

A slide circular saw comprises a base, a saw blade rotatably driven by a motor, and a main body including the saw blade. The slide circular saw is configured to be capable of automatically changing a cutting depth between in a vertical cut and a bevel cut operations. A chamfered part where a lower limit position setting bolt abuts in a vertical cut operation and a peripheral surface part where the lower limit position abuts in a bevel cut operation are provided at a rod of the slide circular saw. The peripheral surface part has a lower limit position of the saw blade being higher than that of the chamfered part. Position of the rod can be switched between a first position where the chamfered part abuts the lower limit position setting bolt when the main body is in a vertical cut position and a second position where the peripheral surface part abuts the lower limit position setting bolt when the main body is in a bevel cut position.

9 Claims, 5 Drawing Sheets

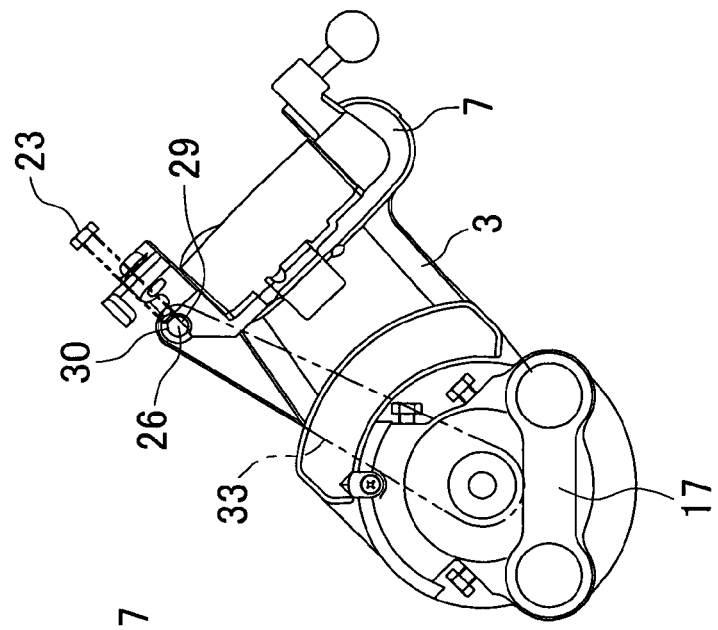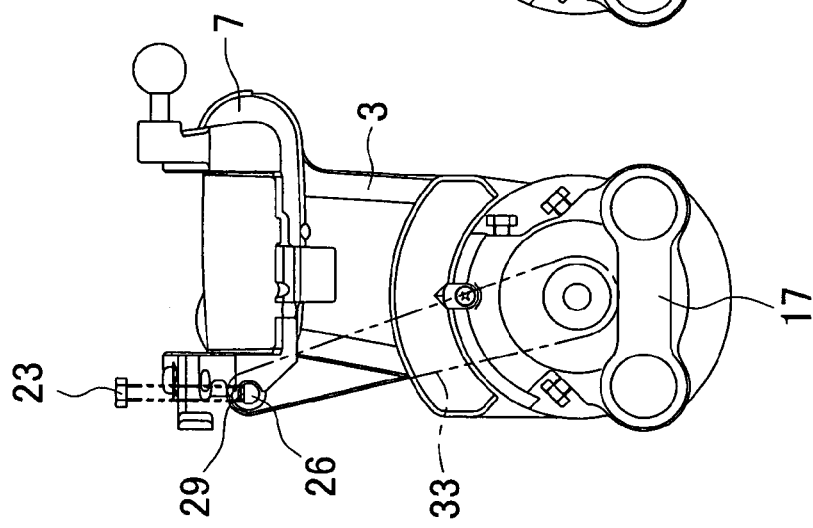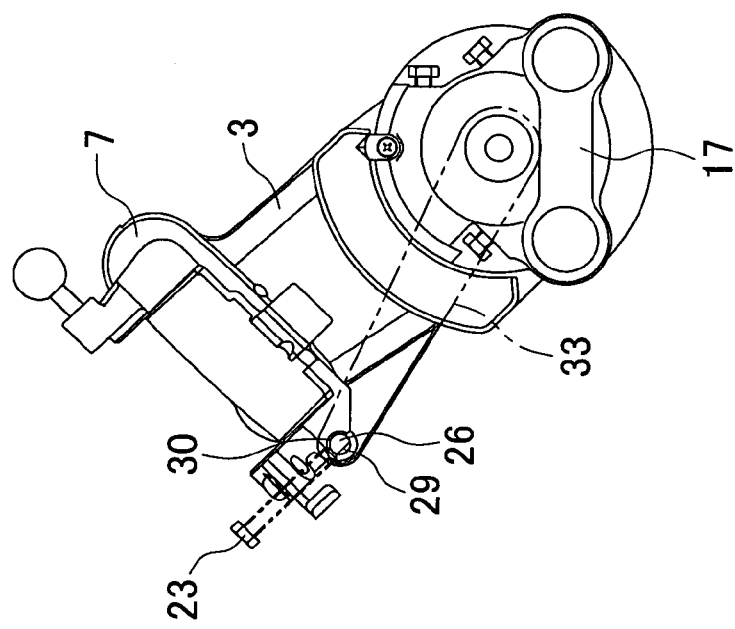

SLIDE CIRCULAR SAW

BACKGROUND OF THE INVENTION

This application claims the entire benefit of Japanese Patent Application Number 2008-228891 filed on Sep. 5, 2008, the entirety of which is incorporated by reference.

TECHNICAL FIELD

This invention relates to a slide circular saw comprising a base, a saw blade and a main body including the saw blade, wherein the main body is configured to be movable in a vertical direction and in a tilted state, and slidable frontward and rearward above the base.

BACKGROUND ART

A conventional slide circular saw as disclosed for example in JP 11-34002 A comprises a base and a main body including a motor-driven rotary saw blade, wherein the main body is configured to be movable vertically and slidable frontward and rearward above the base, so that a workpiece even with a long anteroposterior length can be slidably cut by a lowering operation and a sliding operation of the main body. Further, since the main body is configured to be capable of being tilted at least to one of the right and the left directions, not only a vertical cut can be performed by vertically lowering the main body with respect to the base but a bevel cut can be also performed by lowering the main body at a predetermined angle (of 45 degrees, for example) with respect to the base.

In the aforementioned slide circular saw, a lower limit stopper mechanism is provided to determine a cutting depth of the workpiece placed on the base. This lower limit stopper mechanism includes a lower limit restricting bolt (an abutment member) provided at the main body and a lower limit switching plate (a receiving member) provided at a portion to be a fixed side (an arm pivotally supporting the main body, for example) with respect to the vertical movement of the main body. In the lower limit stopper mechanism, when the main body is lowered and the lower limit restricting bolt abuts the lower limit switching plate, a lower limit position is determined. It should be noted here that the lower limit switching plate can be moved between a lower limit restricting position where the plate abuts the lower limit restricting bolt and a lower limit releasing position where the plate does not abut lower limit restricting bolt, so that the lower limit stopper mechanism can be easily switched between in operation and not in operation.

Further, in a conventional slide circular saw as described in JP 11-34002 A, for example, where a diameter of the saw blade is short, it is necessary to widen a sliding stroke or deepen the cutting depth of the saw blade in order to secure enough anteroposterior length corresponding to a workpiece for a slide cut. However, when the sliding stroke is widened, the overall size of the slide circular saw would not be reduced. On the other hand, when enough cutting depth is maintained, a bevel angle will be constrained during bevel cut, because while a bevel cut is performed, a motor etc. which protrudes from the tilted main body is prone to interfere with a guide fence etc. at a side of the base. Therefore, a cutting capability is impaired. To solve the problem, the lower limit position of the main body (the saw blade) is configured to be switched depending on the operations of either the vertical cut or the bevel cut with applying the lower limit switching plate as described in JP 11-34002 A. However, a manual switching operation may be troublesome and have a possibility of neglecting the operation, and thus a usability of the slide circular saw would be impaired.

Under the circumstances, one of the objects of the present invention is to provide a slide circular saw capable of automatically changing a cutting depth depending on whether the vertical cut or the bevel cut is performed for improving the usability. Further, the present invention is capable of slide-cutting a workpiece while securing enough anteroposterior length without widening a sliding stroke, while retaining a capability of the bevel cut operation.

SUMMARY OF INVENTION

It is a first aspect of the present invention to provide a slide circular saw comprising: a base; a saw blade rotatably driven by a motor; a main body including the saw blade provided movable vertically, slidable frontward and rearward, and capable of being tilted at least to one of the right and the left directions above the base, wherein the main body is configured to be capable of performing a vertical cut on a workpiece placed on the base with a predetermined cutting depth by a vertical lowering of the main body and capable of performing a bevel cut on the workpiece with a predetermined cutting depth by a lowering of the tilted main body; and a cutting depth switching mechanism moving in conjunction with a tilting movement of the main body so that the cutting depth in the bevel cut operation is arranged to be shallower than that in the vertical cut operation.

According to a second aspect of the present invention, in the configuration according to the first aspect, preferably but not necessarily, the cutting depth switching mechanism comprises an abutment member provided at the main body and a receiving member provided at a portion to be a fixed side with respect to the vertical movement of the main body, so that the cutting depth switching mechanism is provided in a small space. The cutting depth is determined when the abutment member abuts the receiving member in conjunction with the lowering of the main body.

According to a third aspect of the present invention, in the configuration according to the second aspect, preferably but not necessarily, the cutting depth switching mechanism comprises a first abutment portion where the abutment member abuts in the vertical cut operation, a second abutment portion where the abutment portion abuts in the bevel cut operation, and an interlocking mechanism. The first and the second abutment portions are provided at the receiving member, and the second abutment portion has the lower limit position of the saw blade being higher than that of the first abutment portion. The interlocking mechanism switches a position of the receiving member between a first position in which the first abutment portion abuts the abutment member when the main body is in a vertical cut position and a second position in which the second abutment portion abuts the abutment member when the main body is in a bevel cut position.

According to a fourth aspect of the present invention, in the configuration according to the third aspect, preferably but not necessarily, the receiving member is a rod having a chamfered part as the first abutment portion and a peripheral surface part as the second abutment portion, and a switching operation is performed by a rotation of the rod, so that the cutting depth is easily determined between in the vertical cut and the bevel cut operations.

According to a fifth aspect of the present invention, in the configuration according to the third aspect, preferably but not necessarily, the receiving member is a rod which is configured to have a radial distance between a center and a peripheral surface of the rod getting longer as getting closer to a circumferential direction of the rod, the rod has a first peripheral surface part with a shorter radial distance as the first abutment portion and a second peripheral surface part with a radial distance longer than that of the first peripheral surface part as the second abutment portion, and performs a switching operation by a rotation of the rod.

According to a sixth aspect of the present invention, in the configuration according to the third aspect, preferably but not necessarily, the interlocking mechanism comprises a lower pulley fixed at a supporting point for the tilting movement of the main body, an upper pulley provided on and coaxially with the rod, and an endless belt provided between the upper and the lower pulleys, so that the rod is accurately rotated to the first and the second positions respectively in conjunction with the tilting movement of the main body.

Advantageous effects of some aspects and embodiments of the present invention as described above are as follows:

With the configuration according to the first aspect of the present invention, the cutting depth in the vertical cut and the bevel cut operations can be automatically changed by the cutting depth switching mechanism and thus the ease of use can be improved. Further, as the cutting depth is shallower in the bevel cut operation, a slide cut of a workpiece where an anteroposterior length is long can be performed without widening a sliding stroke and thus reduction of the overall size of the slide circular saw can be expected. Moreover, the main body does not interfere with the guide fence etc. when it is tilted, so that a capability of the bevel cut operation would not be impaired.

According to the second and the third aspects of the present invention, the advantage of the configuration according to the first aspect can be brought about as well, and besides, the cutting depth switching mechanism can be easily provided in a small space so that changing of the cutting depth can be securely performed.

According to the fourth aspect of the present invention, the advantage of the configuration according to the third aspect can be brought about as well, and besides, each cutting depth in the vertical cut and the bevel cut operations can be easily determined with the chamfered part and the peripheral surface part both provided at the rod.

According to the fifth aspect of the present invention, the advantage of the configuration according to the third aspect can be brought about as well, and besides, the first and the second abutment portions can be easily formed with the rod having varied radial distance.

According to the sixth aspect of the present invention, the advantage of the configuration according to the third aspect can be brought about as well, and besides, the rod can be accurately rotated to the first and the second positions respectively in conjunction with the tilting movement of the main body.

BRIEF DESCRIPTION OF THE DRAWINGS

The above aspects, other advantages and further features of the present invention will become more apparent by descriptions of in detail illustrative, non-limiting embodiments thereof with reference to the accompanying drawings, in which:

FIG. 4A is a front view of the arm tilted at 45 degrees to the left of the slide circular saw;

FIG. 4B is a front view of the arm at a right angle of the slide circular saw;

FIG. 4C is a front view of the arm tilted at 45 degrees to the right of the slide circular saw;

DESCRIPTION OF EMBODIMENTS

Exemplary embodiments of the present invention will be described hereinafter with reference to the accompanying drawings.

Figure 1:
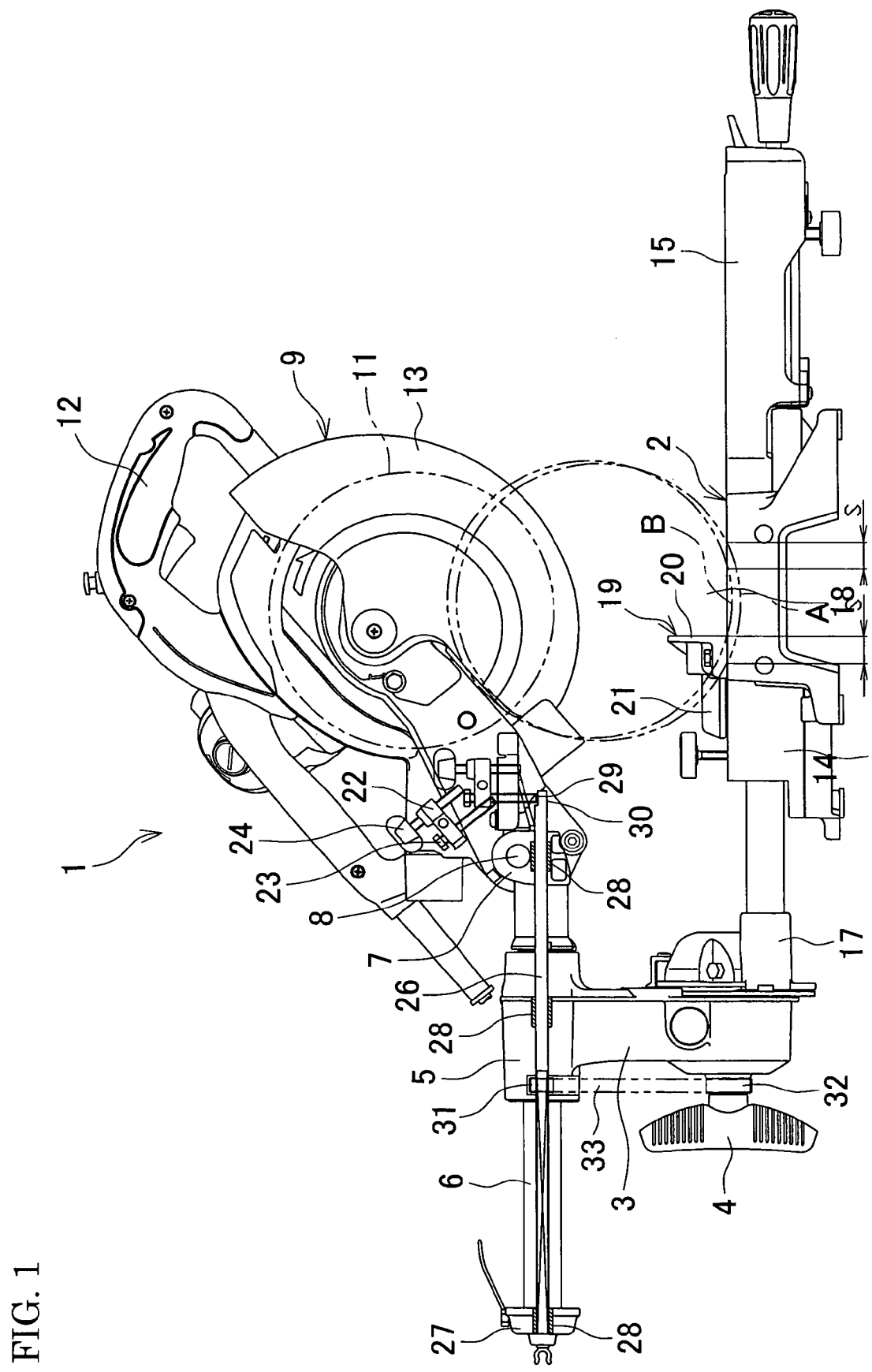
FIG. 1 is a side view of a slide circular saw according to an exemplary embodiment of the present invention.
Figure 2:
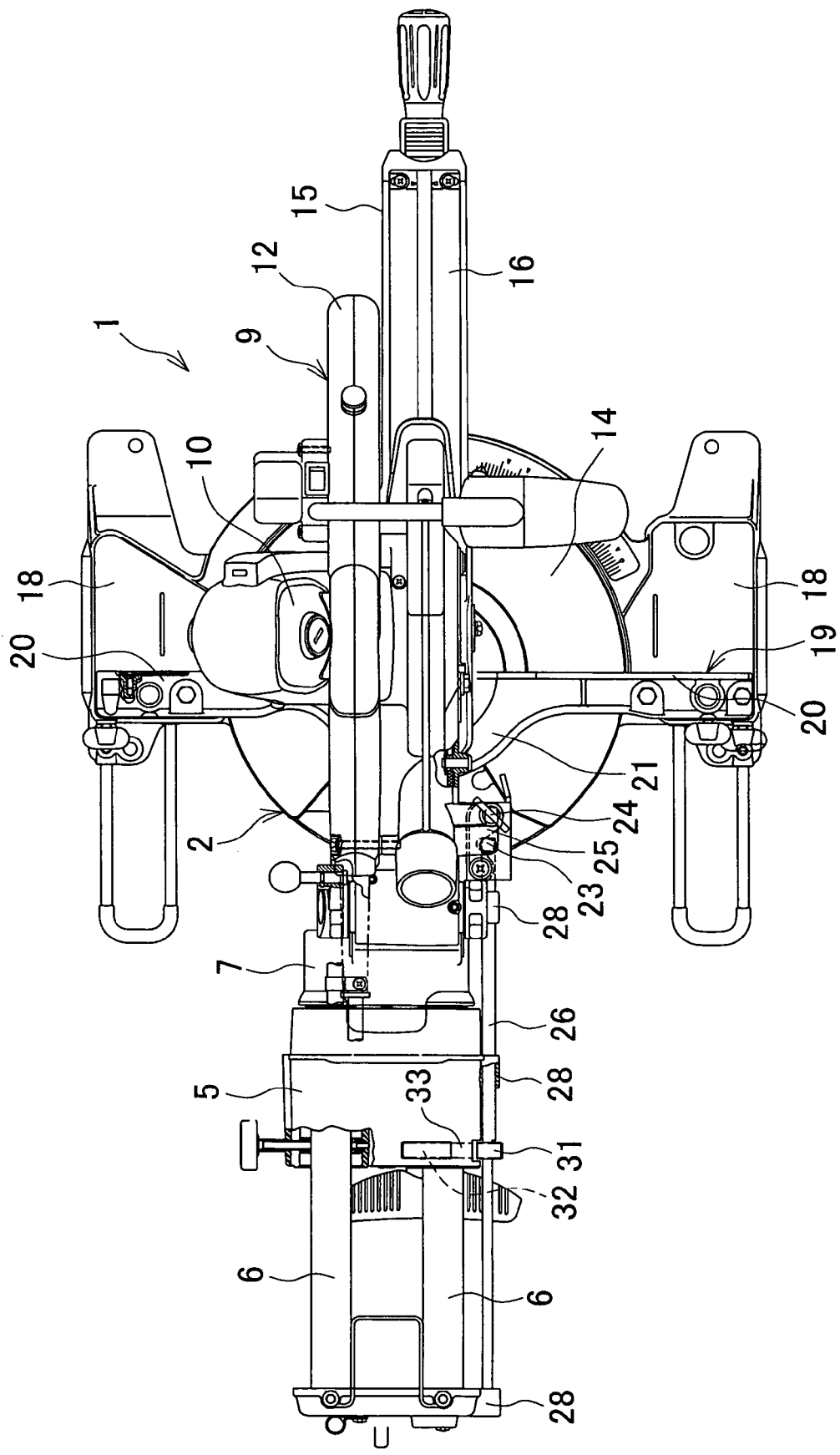
FIG. 2 is a plan view of the slide circular saw.

Referring now to FIGS. 1 and 2, a slide circular saw 1 comprises a base 2, an arm 3 including a lever 4 and provided rearward of the base 2 (on a left side of FIG. 1). The arm 3 is configured to be capable of rotating 45 degrees maximum to a right-left direction and capable of being fixed at any angles. The slide circular saw 1 also includes a tubular-shaped holder 5 provided at an upper end of the arm 3, a pair of poles 6, 6 loosely inserted into the holder 5 slidably in an anteroposterior direction, a front end part 7 connecting each front end of the poles 6, 6, and a main body 9 connected rotatably in a vertical direction to the front end part 7 via a supporting axis 8. The main body 9 includes a disk-shaped rotary saw blade 11 driven by the motor 10 provided at a right side of the main body 9, and is held by a torsion spring (not shown) provided at the supporting axis 8 at an upper limit position shown in FIG. 1 when the main body 9 is in a normal state. Reference numeral 12 indicates an operation knob for the main body 9 and reference numeral 13 indicates a safety cover for the saw blade 11.

A turn base 14 is rotatably placed on a center of the base 2. The turn base 14 is circular-shaped when viewed from above and has an extension part 15 protruding to a radial direction at a front thereof. A kerf blade guide plate 16 is continuously provided on an upper surface of the extension part 15 to a center of the turn base 14. The arm 3 is connected to an arm holder 17 protruding rearward from a rear surface of the turn base 14.

Further, at the base 2, a guide fence 19 is disposed between placement parts 18 and 18 provided at the right and the left sides of the turn base 14 and having a height of both upper surfaces equal to that of the turn base 14. The guide fence 19 comprises a right-left matched pair of guide parts 20, 20 and a semicircular-shaped roundabout part 21 passing around the kerf blade guide plate 16 rearward of the guide fence 19 and connecting both the guide parts 20, 20. Each guide part 20 is fixed on the placement parts 18 with a bolt respectively.

In the main body 9, a supporting board 22 is provided protrusively on a left side surface of the main body 9 closer to the supporting axis 8. A lower limit position setting bolt 23 as an abutment member is threadably mounted in a downward direction on the supporting board 22 and configured to be movable in a circular arc pattern around the supporting axis 8 with the vertical movement of the main body 9 around the supporting axis 8. Reference numeral 24 indicates a lowest limit position setting bolt threadably mounted on the supporting board 22 and parallel to the lower limit position setting bolt 23. A lower end of the lowest limit position setting bolt 24 is positioned above a lower end of the lower limit position setting bolt 23, so that the lowest limit position of the main body 9 is determined at a position where the lowest limit position setting bolt 24 abuts a bolt receiving part 25 provided at a front end part 7.

A rod 26 as a receiving member is provided at a left side surface of the holder 5. The rod 26 is an axial-shaped body parallel to poles 6, 6 and rotatably supported by axis supporting parts 28, 28 . . . in such a state that a front end of the rod 26 is positioned on a trajectory of lowering the lower limit position setting bolt 23. The axis supporting parts 28, 28 . . . are provided at a side surface of a rear end part 27 connecting each rear end of the poles 6, 6, at a side surface of the holder 5, and at a side surface of the front end part 7. Further, the rod 26 is configured to be movable to an axial direction with respect to the axis supporting part 28 provided at the holder 5. A chamfered part 29 is provided at the front end of the rod 26 as a first abutment portion where a lower end of the lower limit position setting bolt 23 can abut, and the rest portion of the front end of the rod 26 excluding the chamfered part 29 is a semicircular-shaped peripheral surface part 30 as a second abutment portion. The rod 26 and the lower limit position setting bolt 23 at a side of the main body 9 are arranged to form a lower limit stopper mechanism.

Figure 3:
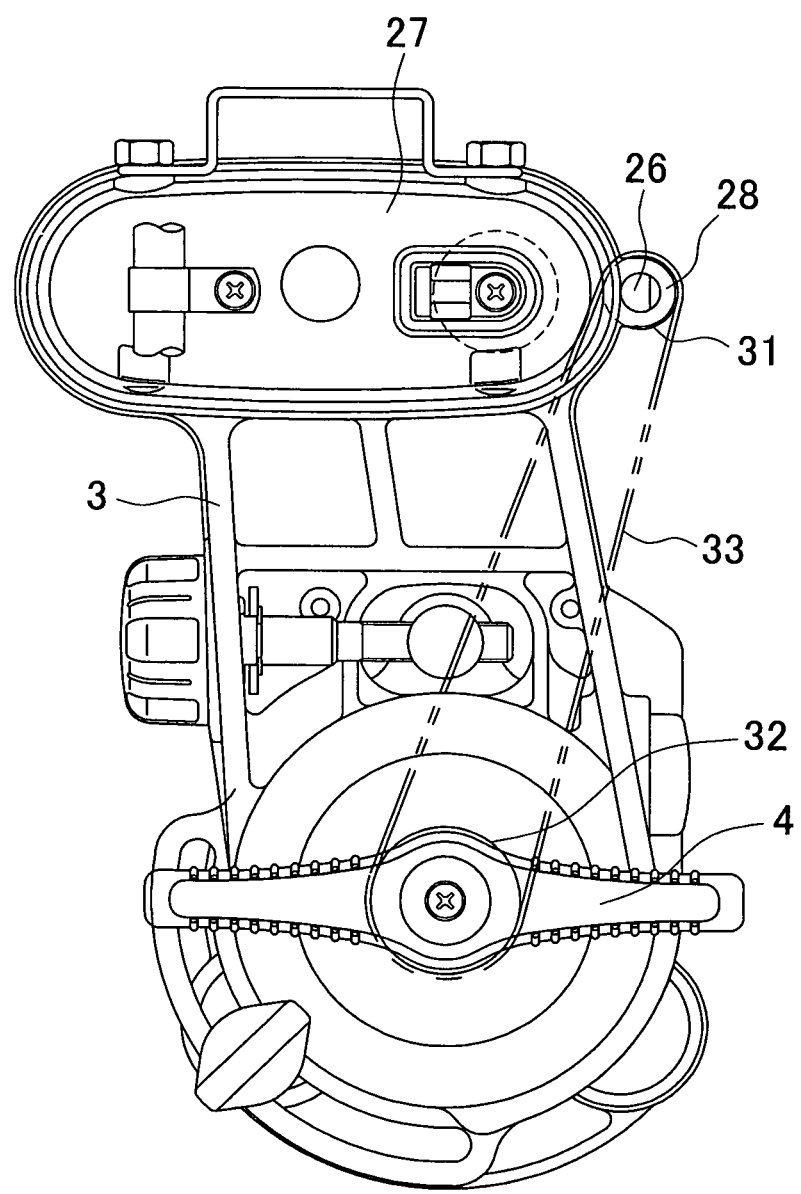
FIG. 3 is a back view of an arm of the slide circular saw.

Furthermore, as shown in FIG. 3, an upper pulley 31 is placed on the rod 26 at a side surface of the holder 5 coaxially with the rod 26 and movable to an axial direction, and a lower pulley 32 is fixed at a concentric position (a penetrating part of a lever 4) with a supporting point for the tilting movement at the rear surface of the arm 3. An endless belt 33 is provided around the upper pulley 31 and the lower pulley 32. It should be noted that a chamfer is formed at approximately a rear half region of the rod 26 and a plane part corresponding to the chamfer of the rod 26 is a part of a circumferential surface of a through hole of the rod 26 at the upper pulley 31 so as to prevent the rod 26 and the upper pulley 31 from rotating relatively to each other. With this configuration, an interlocking mechanism is formed. The interlocking mechanism serves to rotate the upper pulley 31 by rotating the belt 33 while swinging the belt 33 with respect to the fixed lower pulley 32 when the arm 3 moves in a tilting manner to a right-left direction, so that the rod 26 and the upper pulley 31 are rotated concurrently. This interlocking mechanism, and the chamfered part 29 and the peripheral surface part 30 both formed on the rod 26 are arranged to constitute a cutting depth switching mechanism of the present invention.

In a vertical cut position where the arm 3 is orthogonal to the turn base 14, the rod 26 is in a phase (a first position) where the chamfered part 29 faces upward as shown in FIG. 4B. Further, in a position where the arm 3 is tilted at 45 degrees to the left with respect to the turn base 14, the rod 26 rotates counterclockwise by the belt 33 until being in a phase (a second position) where the chamfered part 29 faces left below as shown in FIG. 4A. Conversely, in a position where the arm 3 is tilted at 45 degrees to the right with respect to the turn base 14, the rod 26 rotates clockwise until being in a phase (the second position) where the chamfered part 29 faces right below as shown in FIG. 4C.

To perform vertical cut with the slide circular saw 1 with the above-described configuration, first, a workpiece is placed on an upper surface of the turn base 14 in such a state that the arm 3 is orthogonal to the turn base 14. Secondly, an operation knob 12 is manipulated to lower the main body in such a state that the workpiece is positioned in place by being pressed against the guide fence 19. In conjunction with the lowering of the main body 9, the saw blade 11 lowers until the lower end of the lower limit position setting bolt 23 abuts the chamfered part 29 of the rod 26 as shown in FIG. 4B, so that the vertical cut can be performed. The saw blade 11 at a lower limit position in this operation is shown as A in FIG. 1.

On the other hand, to perform bevel cut, the operation knob 12 is manipulated to tilt the main body 9 and the arm 3 either to the right or the left while the lever 4 is loosened, and then the lever 4 is tightened at a desired angle so as to fix the arm 3. When the arm 3 is tilted at 45 degrees to the left direction for example, the rod 26 rotates counterclockwise via the belt 33 and then the chamfered part 29 faces left below as shown in FIG. 4A. Therefore, while the main body 9 is lowered under this state, it is stopped at the lower limit position where the lower end of the lower limit position setting bolt 23 abuts the peripheral surface part 30 of the rod 26. The saw blade 11 at the lower limit position in this operation is shown as B in FIG. 1.

On the contrary, when the arm 3 is tilted at 45 degrees to the right direction, the rod 26 rotates clockwise via the belt 33 and then the chamfered part 29 faces right below as shown in FIG. 4C. Therefore, while the main body is lowered under this state, it is stopped at the lower limit position where the lower end of the lower limit position setting bolt 23 abuts the peripheral surface part 30 of the rod 26. The saw blade 11 at the lower limit position in this operation is shown as B in FIG. 1.

In this configuration, the lower limit positions of the saw blade 11 are designed to differ between in the vertical cut and the bevel cut operations, and the cutting depth in the bevel cut operation is shallower than that in the vertical cut operation. Therefore, an anteroposterior cutting length of a workpiece on the upper surface of the kerf blade guide plate 16 is longer in the vertical cut operation (indicated by S in FIG. 1) than that in the bevel cut operation. Thus, when a slide cut in the vertical cut operation is performed by sliding of the main body 9 frontward and rearward, a long sliding stroke can be ensured even with the saw blade 11 having a short diameter. Conversely, in the bevel cut operation the cutting depth is shallower than that in the vertical cut operation, so that a motor 10 and the like of the main body 9 do not interfere with the guide fence 19 etc. and therefore the main body 9 can be tilted at any angles to 45 degrees maximum to the right or the left directions.

According to the above-described slide circular saw 1, the cutting depth switching mechanism, which moves in conjunction with the tilting movement of the main body 9 so as to make the cutting depth in the bevel cut operation shallower than that in the vertical cut operation, is provided, so that the cutting depths between in the vertical cut and the bevel cut operations can be automatically changed, which can improve the ease of use. Further, an enough anteroposterior length of the workpiece to be cut slidably can be secured without widening a sliding stroke, which can reduce the overall size of the slide circular saw. Moreover, the tilted main body 9 is ensured not to interfere with the guide fence 19 etc. so that a capability of the bevel cut operation would not be impaired.

Further, the abutment member (lower limit position setting bolt 23) is provided at the main body 9 and the receiving member (rod 26) is provided at the holder 5, and that the cutting depth switching mechanism comprising the first abutment portion (chamfered part 29), the second abutment portion (peripheral surface part 30) and the interlocking mechanism is provided. Here, the first and the second abutment portions are provided at the rod 26. The first abutment portion abuts the lower limit position setting bolt 23 in the vertical cut operation, and the second abutment portion abuts the lower limit position setting bolt 23 in the bevel cut operation where the lower limit position of the saw blade 11 is higher than that of the first abutment portion. With the interlocking mechanism a position of the rod 26 is switched between a first position in which the chamfered part 29 abuts the lower limit position setting bolt 23 when the main body is in the vertical cut position and a second position in which the peripheral surface part 30 abuts the lower limit position setting bolt 23 when the main body is in the bevel cut position. With this configuration, the cutting depth switching mechanism is easily provided in a small space, and further changing of the cutting depths can be securely performed.

Further, the receiving member is configured to be the rod 26 having the chamfered part 29 as the first abutment portion and the peripheral surface part 30 as the second abutment portion, and a switching operation is performed by a rotation of the rod 26, so that the cutting depths in the vertical cut and the bevel cut operations respectively can be easily determined.

Moreover, the interlocking mechanism is configured to comprise the lower pulley 32 fixed at the supporting point for the tilting movement of the main body 9, the upper pulley 31 provided on and coaxially with the rod 26, and an endless belt 33 provided around the upper pulley 31 and the lower pulley 32, so that the rod 26 can be accurately rotated to the first and the second positions respectively in conjunction with the tilting movement of the main body 9.

Although the present invention has been described in detail with reference to the above preferred embodiment, the present invention is not limited to the above specific embodiment and various changes and modifications may be made without departing from the scope of the appended claims.

Figure 5A:
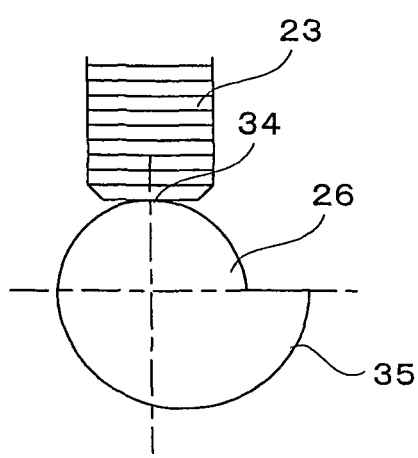
FIG. 5A is an explanatory drawing showing an altered example of a rod at a right angle of the slide circular saw.
Figure 5B:
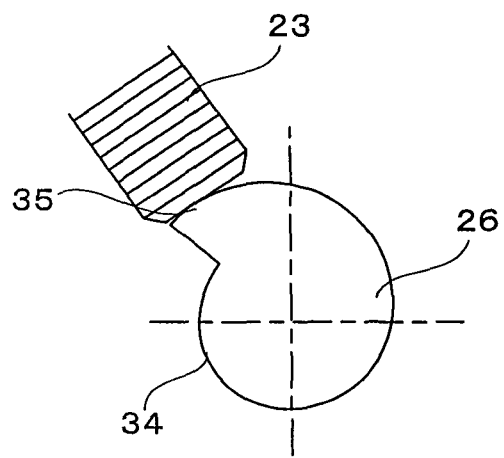
FIG. 5B is an explanatory drawing showing another altered example of the rod at a tilted angle of the slide circular saw.

For example, the first and the second abutment portions of the rod provided in a front end of the rod may be provided closer to a rear end, and the chamfered part and the peripheral surface part may be formed as other shaped parts such as a recessed part, a stepped part and the like as long as the lower limit position of the saw blade can be changed. Further, the front end part of the rod 26 may have a cam-shaped configuration which has a radial distance between a center and a peripheral surface of the rod getting longer as getting closer to a circumferential direction of the rod as shown in FIG. 5. With this configuration, by configuring the first abutment portion to be a first peripheral surface part 34 having a shorter dimension and the second abutment portion to be a second peripheral surface part 35 having a dimension longer than that of the first peripheral surface part 34, the lower limit positions can be switched between in the vertical cut (FIG. 5A) and the bevel cut (FIG. 5B) operations. In this way as well, the first and the second abutment portions can be easily formed.

Moreover, a sprocket, a chain and a plurality of gears etc. may be applied for the interlocking mechanism instead of the pulleys and the belt.

It should be noted that the receiving member may not be limited to the rod, and that a horizontally-rotatable plate etc. with a capability to switch the portions abutting the abutment member by the interlocking mechanism may be applied as the receiving member. Therefore, the interlocking mechanism may also be constituted with other configurations according to a shape of the abutment member. Further, the interlocking mechanism may be provided inside the arm instead of providing a side of the arm.

In addition, the configuration of the slide circular saw may also be modified where appropriate; for example, the main body capable of tilting only either to the right or the left may also be applicable, and further the configuration of the sliding in which the lower end of the arm is slidably connected to the turn base via a pole in an anteroposterior direction may also be applicable. Further, the slide circular saw without the turn base may also be applicable to the present invention.

The invention claimed is:
1. A slide circular saw comprising:
a base;
a saw blade rotatably driven by a motor;
a main body including the saw blade, configured to be movable vertically, capable of tilting at least to one of the right and the left directions, and slidable frontward and rearward above the base, wherein the main body is lowered perpendicularly so as to be capable of performing a vertical cut of a workpiece placed on the base with a predetermined cutting depth and is lowered in a tilted state so as to be capable of performing a bevel cut of the workpiece with a predetermined cutting depth; and
an arm projecting upward from the base and supporting the main body; and a cutting depth switching mechanism moving conjunction with the tilting movement of the main body so that the cutting depth in the bevel cut operation is arranged to be shallower than that in the vertical cut operation,
wherein the cutting depth switching mechanism comprises:
an abutment member provided at the main body;
a receiving member mounted on the arm and having a first abutment portion and a second abutment portion, wherein the abutment member abuts the receiving member in conjunction with a lowering of the main body so that the cutting depth is determined; and
an interlocking mechanism, where the interlocking mechanism switches a position of the receiving member between a first position in which the first abutment portion abuts the abutment member when the main body is lowered into the vertical cut position and a second position in which the second abutment portion abuts the abutment member when the main body is lowered into the bevel cut operation;
wherein the receiving member is a rod having a chamfered part as the first abutment portion and a peripheral surface part as the second abutment portion and the switching operation is performed by a rotation of the rod at the main body and a receiving member is provided at a portion to be fixed side with respect to the vertical movement of the main body, the abutment member abuts the receiving member in conjunction with a lowering of the main body so that the cutting depth is determined,
the cutting depth switching mechanism comprises a first abutment portion where the abutment member abuts in the vertical cut operation, a second abutment portion where the abutment member abuts in the bevel cut operation, a lower limit position of the saw blade is higher than that of the first abutment portion, and an interlocking mechanism, wherein the interlocking mechanism switched a position of the receiving member between a first position in which the first abutment portion abuts the abutment member when the main body is in the vertical cut position and a second position in which the second abutment portion abuts the abutment member when the main body is in the bevel cut operation, and
the receiving member is a rod having a chamfered part as the first abutment portion and a peripheral surface part as the second abutment portion, in which a switching operation is performed by a rotation of the rod.
2. The slide circular saw according to claim 1, wherein the interlocking mechanism comprises a lower pulley fixed at a supporting point for the tilting movement of the main body, an upper pulley provided on and coaxially with the rod, and an endless belt provided around the upper pulley and the lower pulley.
3. The slide circular saw according to claim 2, wherein the rod and the upper pulley are connected integrally in a rotating direction by fitting the chamfered part provided at a side surface of the rod and a plane part which is a part of a circumferential surface of a through hole of the rod at the upper pulley.

4. The slide circular saw according to claim 1, wherein the abutment member is a bolt threadably mounted in a downward direction on a supporting board which is protrusively provided at a side surface of the main body.

5. The slide circular saw according to claim 4, further comprising a second bolt threadably mounted in a downward direction on the supporting board and parallel to the bolt in such a position where a lower end of the second bolt is positioned above that of the bolt, wherein the second bolt abuts a bolt receiving part, in conjunction with a lowering of the main body, provided at a portion where the second bolt is to be at the fixed side, so that a lowest limit of the main body is determined.

6. The slide circular saw according to claim 1, further comprising a turn base rotatably provided at the base and having a kerf blade guide plate which is provided on an upper surface of the turn base and in which the saw blade enters when the main body is lowered.

7. The slide circular saw according to claim 6, wherein the arm is provided rearward of the turn base, a holder provided at an upper end of the arm, and a pair of poles provided slidably frontward and rearward at the holder, wherein the main body is connected rotatably in a vertical direction via a supporting axis to a front end part connecting each front end of the poles.

8. The slide circular saw according to claim 7, wherein the arm is capable of being tilted to the right and the left directions at 45 degrees maximum respectively.

9. A slide circular saw comprising:
a base;
a saw blade rotatably driven by a motor;
a main body including the saw blade, configured to be movable vertically, capable of tiling at least to one of the right and the left directions, and slidable frontward and rearward above the base, wherein the main body is lowered perpendicularly so as to be capable of performing a vertical cut of a workpiece placed on the base with a predetermined cutting depth and is lowered in a tilted state so as to be capable of performing a bevel cut of the workpiece with a predetermined cutting depth;
an arm projecting upward from the base and supporting the main body; and
a cutting depth switching mechanism moving in conjunction with the tilting movement of the main body so that the cutting depth in the bevel cut operation is arranged to be shallower than that in the vertical cut operation,
wherein the cutting depth switching mechanism comprises:
an abutment member provided at the main body;
a receiving member mounted on the arm and having a first abutment portion and a second abutment portion, wherein the abutment member abuts the receiving member in conjunction with a lowering of the main body so that the cutting depth is determined; and
an interlocking mechanism, wherein the interlocking mechanism switched a position of the receiving member between a first position in which the first abutment portion abuts the abutment member when the main body is lowered into the vertical cut position and a second position in which the second abutment portion abuts the abutment member when the main body is lowered into the bevel cut operation,
wherein the receiving member is a rod which is configured to have a radial distance between a center and a peripheral surface of the rod increase along a circumferential direction of the rod, the rod has a first peripheral surface part with the shorter radial distance as the first abutment portion and a second peripheral surface part as the second abutment portion, in which a switching operation is performed by a rotation of the rod.

* * * * *